US010531164B1

(12) United States Patent
Hitchcock

(10) Patent No.: US 10,531,164 B1
(45) Date of Patent: Jan. 7, 2020

(54) CINEMATOGRAPHIC METHOD AND METHODS FOR PRESENTATION AND DISTRIBUTION OF CINEMATOGRAPHIC WORKS

(71) Applicant: Terri Johan Hitchcock, Calgary (CA)

(72) Inventor: Terri Johan Hitchcock, Calgary (CA)

(73) Assignee: Terri Johan Hitchcock, Calgary (CA)

( * ) Notice: Subject to any disclaimer, the term of this patent is extended or adjusted under 35 U.S.C. 154(b) by 337 days.

(21) Appl. No.: 15/486,793

(22) Filed: Apr. 13, 2017

Related U.S. Application Data

(60) Provisional application No. 62/323,951, filed on Apr. 18, 2016.

(51) Int. Cl.
| G06F 15/16 | (2006.01) |
| H04N 21/8541 | (2011.01) |
| H04N 21/835 | (2011.01) |
| H04N 21/414 | (2011.01) |
| H04N 21/25 | (2011.01) |

(52) U.S. Cl.
CPC ......... H04N 21/8541 (2013.01); H04N 21/25 (2013.01); H04N 21/41407 (2013.01); H04N 21/41415 (2013.01); H04N 21/835 (2013.01)

(58) Field of Classification Search
CPC .............. H04N 21/25; H04N 21/835; H04N 21/41415; H04N 21/41407; H04N 21/8541
USPC ........................................................ 709/219
See application file for complete search history.

(56) References Cited

U.S. PATENT DOCUMENTS

| 5,734,916 A * | 3/1998 | Greenfield | G06F 17/22 715/207 |
| 2002/0107721 A1* | 8/2002 | Darwent | G06Q 10/10 703/6 |
| 2012/0151348 A1* | 6/2012 | Mital | H04N 21/47205 715/727 |
| 2014/0108965 A1* | 4/2014 | Schoen | G06Q 10/10 715/753 |
| 2014/0282013 A1* | 9/2014 | Amijee | G06F 16/4393 715/732 |
| 2016/0225187 A1* | 8/2016 | Knipp | G06T 19/006 |

OTHER PUBLICATIONS

Wikipedia Contributors, "Back to the Future (franchise)", Wikipedia, the free encyclopedia; Jul. 16, 2017, 10 pages; <https://en.wikipedia.org/w/index.php?title=Back_to_the_Future_(franchise)&oldid=790862360>.
Wikipedia Contributors, "Vantage Point (film)", Wikipedia, the free encyclopedia, Jul. 13, 2017, 11 pages; <https://en.wikipedia.org/w/index.php?title=Vantage_Point_(film)&oldid=790331190>.
Fischer, "With 'Twixt,' Francis Ford Coppola Wants to Create a Live, Dynamic Cinema Experience", Retrieved from: http://www.slashfilm.com/francis-ford-coppola/, Jul. 23, 2011, 3 pages.

(Continued)

*Primary Examiner* — Frantz B Jean
(74) *Attorney, Agent, or Firm* — Perkins Coie LLP; Alberto Araiza

(57) ABSTRACT

The present disclosure describes specific technical approaches to implementing an arrangement in which two or more individual stories share a common feature or "knot" so as to combine to form a larger overall story, and where the individual stories are presented in different orders to different audiences, with the order of presentation affecting the audience perception of the larger overall story.

6 Claims, 4 Drawing Sheets

(56) References Cited

OTHER PUBLICATIONS

Hardawar, "Soderbergh's experimental 'Mosaic' HBO series hits iPhone and Apple TV", Retrieved from: https://www.engadget.com/2017/11/08/hbo-soderbergh-mosaic-app-show/, Nov. 8, 2017, 2 pages.
Martin, "Mitch Hurwitz Explains His Arrested Development Rules: Watch New Episodes in Order, and Not All at Once", Retrieved from: http://www.vulture.com/2013/05/mitch-hurwitz-dont-binge-watch-arrested-development.html, May 22, 2013, 2 pages.

* cited by examiner

CINEMATOGRAPHIC METHOD AND METHODS FOR PRESENTATION AND DISTRIBUTION OF CINEMATOGRAPHIC WORKS This application claims the benefit of U.S. Provisional Application No. 62/323,951, filed Apr. 18, 2016; which is incorporated herein by reference in its entirety.

FIELD OF INVENTION

The present invention relates to cinematic works, and more particularly to the presentation and distribution of cinematic works.

BACKGROUND

In the film "Vantage Point" (U.S. Copyright Registration No. PA0001592994), the fictional story of a conspiracy against a fictional U.S. president is told and re-told from the perspective of a variety of different characters, with each re-telling revealing different aspects of the story and gradually exposing more details of the plot and its eventual outcome. While this remains an intriguing approach to story-telling, the order of the unfolding perspectives will always be the same for all viewers.

SUMMARY

The present disclosure is directed to implementing an arrangement in which two or more individual stories share a common feature or "knot" so as to combine to form a larger overall story, and where the individual stories are presented in different orders to different audiences, with the order of presentation affecting the audience perception of the larger overall story. For example, two different movies sharing the same release schedule and each telling its own story may have a commonality or "knot" that combines them into a larger story and may be presented as a "double header" with different audiences seeing the two movies in different orders. The present disclosure is directed not to the artistic concept, but to specific technical approaches to implementing it, as will be described further below.

In one aspect, the present disclosure is directed to a method for presenting cinematographic works. The method comprises imposing authorization limits which limit authorization to present a first complete cinematographic work and a second complete cinematographic work. The first complete cinematographic work and the second complete cinematographic work are unreleased when the authorization limits are imposed. The method further comprises disseminating at least one communication containing information linking the first complete cinematographic work to the second complete cinematographic work. In addition, the method comprises substantially simultaneously removing the authorization limits so as to authorize presentation of both the first complete cinematographic work and the second complete cinematographic work, and, after removing the authorization limits so as to authorize presentation of the first complete cinematographic work and the second complete cinematographic work, causing to be presented, using at least one cinematographic presentation device, a first synthesis cinematographic work and a second synthesis cinematographic work. The first synthesis cinematographic work comprises the first complete cinematographic work followed by the second complete cinematographic work, and the second synthesis cinematographic work comprises the second complete cinematographic work followed by the first complete cinematographic work. The first synthesis cinematographic work is presented to at least one first individual and the second synthesis cinematographic work is presented to at least one second individual different from the first individual. Using at least one cinematographic presentation device is essential.

In one embodiment of the method, imposing the authorization limits further comprises limiting authorization to present a third complete cinematographic work that is unreleased when the authorization limits are imposed, and the at least one communication contains further information linking the third complete cinematographic work to at least one of the first complete cinematographic work and the second complete cinematographic work. In such an embodiment of the method, substantially simultaneously removing the authorization limits comprises substantially simultaneously authorizing presentation of the first complete cinematographic work, the second complete cinematographic work and the third complete cinematographic work, and the method further comprises, after authorizing presentation of the first complete cinematographic work, the second complete cinematographic work and the third complete cinematographic work, presenting, using at least one cinematographic presentation device, a third synthesis cinematographic work. The third synthesis cinematographic work comprises one of the first complete cinematographic work followed by the third complete cinematographic work, the second complete cinematographic work followed by the third complete cinematographic work, the third complete cinematographic work followed by the first complete cinematographic work and the third complete cinematographic work followed by the second complete cinematographic work. In this embodiment, the third synthesis cinematographic work is presented to at least one third individual different from the first individual and the second individual.

In another aspect, the present disclosure is directed to a method for theatrical presentation of cinematographic works. The method comprises organizing a plurality of patrons into a first group of patrons and a second group of patrons. The method uses at least one cinematograph to present, to the first group of patrons, a first synthesis cinematographic work, and using the at least one cinematograph to present, to the second group of patrons, a second synthesis cinematographic work. The first synthesis cinematographic work comprises a first complete cinematographic work followed by a second complete cinematographic work, and, the second synthesis cinematographic work comprises the second complete cinematographic work followed by the first complete cinematographic work. The use of the at least one cinematograph is essential.

In some embodiments of the method, presentation of the first synthesis cinematographic work temporally overlaps presentation of the second complete cinematographic work.

In some embodiments of the method, the first synthesis cinematographic work is presented in a first movie theater in a movie theater multiplex and the second synthesis cinematographic work is presented in a second movie theater in the movie theater multiplex.

In other embodiments, the first synthesis cinematographic work and the second synthesis cinematographic work are presented in a single movie theater. In such embodiments, the method may further comprise, before presenting the second complete cinematographic work, presenting the first complete cinematographic work while the first group of patrons is in the single movie theater and the second group of patrons is absent from the single movie theater, presenting the second complete cinematographic work while both the first group of patrons and the second group of patrons are in the single movie theater, and, after presenting the second complete cinematographic work, presenting the first complete cinematographic work again while the second group of patrons is in the single movie theater and the first group of patrons is absent from the single movie theater. In such embodiments, a single presentation of the second complete cinematographic work is common to presentation of the first synthesis cinematographic work and presentation of the second synthesis cinematographic work.

Organizing the plurality of patrons into the first group of patrons and the second group of patrons may be carried out, for example, by random selection, by algorithmic selection or by individual patrons selecting one of the first synthesis cinematographic work and the second synthesis cinematographic work.

In a further aspect, the present disclosure is directed to a method for transmitting cinematographic works to remote cinematographic presentation devices. The method comprises organizing a plurality of remote cinematographic presentation devices into a first group of remote cinematographic presentation devices and a second group of remote cinematographic presentation devices and transmitting, to the plurality of remote cinematographic presentation devices, a first complete cinematographic work and a second complete cinematographic work. The method further comprises causing the first group of remote cinematographic presentation devices to present a first synthesis cinematographic work and causing the second group of remote cinematographic presentation devices to present a second synthesis cinematographic work. The first synthesis cinematographic work comprises the first complete cinematographic work followed by the second complete cinematographic work, and the second synthesis cinematographic work comprises the second complete cinematographic work followed by the first complete cinematographic work.

The remote cinematographic presentation devices may comprise, for example, televisions and/or computers.

In some embodiments, organizing the plurality of remote cinematographic presentation devices into the first group of remote cinematographic presentation devices and the second group of remote cinematographic presentation devices is carried out by a transmission system that transmits the first complete cinematographic work and the second complete cinematographic work. In other embodiments, organizing the plurality of remote cinematographic presentation devices into the first group of remote cinematographic presentation devices and the second group of remote cinematographic presentation devices is carried out by the plurality of remote cinematographic presentation devices.

The transmitting may comprise at least one of Internet streaming, television broadcasting and cable transmission. The transmitting may also or alternatively comprise transmitting storable media data for storage on the plurality of remote cinematographic presentation devices and later playback thereon.

In a still further aspect, a method for transmitting cinematographic works to remote cinematographic presentation devices comprises transmitting, from a distribution system to a plurality of remote digital cinematographic presentation devices, digital copies of a plurality of complete cinematographic works. The complete cinematographic works are conjoinable according to at least two unique permutations to form at least two unique synthesis cinematographic works.

In preferred embodiments, a first one of the remote cinematographic presentation devices presents a first one of the unique synthesis cinematographic works and a second one of the remote cinematographic presentation devices presents a second one of the unique synthesis cinematographic works. The first one of the remote cinematographic presentation devices is different from the second one of the remote cinematographic presentation devices and the first synthesis cinematographic work is different from the second synthesis cinematographic work.

The permutations may be specified locally on the remote digital cinematographic presentation devices.

The digital copies of the complete cinematographic works may be transmitted by at least one of Internet streaming and transmitting storable media data for storage on the plurality of remote cinematographic presentation devices and later playback thereon.

BRIEF DESCRIPTION OF THE DRAWINGS

These and other features of the invention will become more apparent from the following description in which reference is made to the appended drawings wherein.

DETAILED DESCRIPTION

Figure 1A:
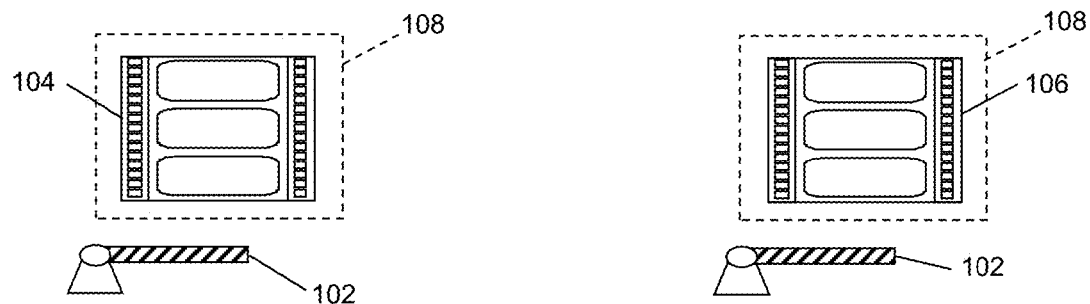
FIGS. 1A to 1C schematically illustrate a method for presenting cinematographic works according to an aspect of the present disclosure.

The term "cinematographic work", as used herein, refers to the recorded form of a motion picture, either with or without sound, and the term "motion picture" is used in its broadest sense to include, without limitation, live action, traditional animation, stop motion animation, computer animation, motion comics, and any combination thereof. The recorded form may be any form capable of reliable reproduction, including traditional film and digital media of any kind.

A "complete cinematographic work", as that term is used herein, refers to a cinematographic work which tells a self-contained story or part thereof (i.e. a cinematographic work that ends with "to be continued" may still be a complete cinematographic work). For example, each of "Back to the Future" (U.S. Copyright Registration No. PA0000266708), "Back to the Future, Part II" (U.S. Copyright Registration No. PA0000451911) and "Back to the Future, Part III" (U.S. Copyright Registration No. PA0000473604) would individually be considered a complete cinematographic work.

The term "synthesis cinematographic work" refers to the unified whole that results from placing at least two complete non-sequel cinematographic works back-to-back (although there may be an intermission between presentation of the individual complete cinematographic works) where the complete non-sequel cinematographic works share a common feature or "knot" so as to combine to form a larger overall story. The combination of "Back to the Future", "Back to the Future, Part II" and "Back to the Future, Part III" (or of either "Back to the Future" and "Back to the Future, Part II" or "Back to the Future, Part II" and "Back to the Future, Part III") would not be considered to be a synthesis cinematographic work because "Back to the Future", "Back to the Future, Part II" and "Back to the Future, Part III", although combining to tell a larger overall story, share a sequel relationship with one another. Because of the sequel relationship, these films are to be presented in their predefined order. Thus, the term "synthesis cinematographic work" excludes the back-to-back arrangement of two or more sequels.

In accordance with the present disclosure, two or more complete cinematographic works can be used to form at least two different synthesis cinematographic works by presenting the complete cinematographic works in different back-to-back arrangements. Each of the back-to-back arrangements tells a larger overall story than any of the individual complete cinematographic works. The different ordering of the complete cinematographic works results in viewers of the different synthesis cinematographic works having different perspectives of the larger overall story even though all viewers will have seen the same individual complete cinematographic works. The term "back-to-back" is not intended to exclude pauses between or during individual complete cinematographic works, and likewise, advertisements or other filler elements may be inserted within or between the individual complete cinematographic works that form a synthesis cinematographic work.

For example, each of the complete cinematographic works might show one side of a conflict against the other (family versus family, gang versus gang, business versus business, and/or any combination across any of these), with the perspective of which side is "right" depending on the order in which complete cinematographic works are presented as part of the synthesis cinematographic work.

Alternatively, two seemingly unrelated complete cinematographic works may share a commonality. One example of a commonality is a common occurrence/event (a fire, a shooting, a fight, an explosion, a shared interaction of seeming insignificance such as a passing of two characters in a mall, park or other common area). Another example of a commonality is shared supporting characters across the two complete cinematographic works (i.e. assistants, a musical component, fire department/police department, gang, protagonists/heroes, restaurant staff, etc.). A further example of a commonality is a common object (i.e. a weapon with uniquely identifying features, a tattoo, a souvenir, photo, stuffed animal with repaired stitching, unique quilt, etc.) that may be shared between complete cinematographic works.

As another alternative, one complete cinematographic work could show an experience and its impact on the characters while the other complete cinematographic work shows how forces outside the characters' knowledge are impacting the outcomes (i.e. ghosts, angels/demons, universal energy, God-like intervention).

Still a further alternative would be to have one complete cinematographic work show an experience and storyline in the third person, with one or more other complete cinematographic works recounting the same experience in the first person (possibly across multiple characters with three or more complete cinematographic works).

The complete cinematographic work may, but need not, share a common timeline.

Importantly, while each complete cinematographic work tells a complete story and can be enjoyed independently, where the two (or more) complete cinematographic works are viewed as part of a synthesis cinematic work, the viewer's perception of the characters/events involved will be impacted by which complete cinematographic work is seen first (i.e. a character may be positioned as the villain in one complete cinematographic work, but as a hero in the other complete cinematographic work). Thus, when used within the terms "first complete cinematographic work" and "second complete cinematographic work", the words "first" and "second" do not imply an order of presentation within a synthesis cinematic work but merely distinguish between two different complete cinematographic works. For example, a synthesis cinematic work may comprise a second complete cinematic work followed by a first complete cinematographic work.

Certain non-limiting examples will now be provided to illustrate sets of complete cinematographic works that can be combined into different synthesis cinematographic works.

In one example, a first complete cinematographic work and a second complete cinematographic work relate two different storylines about the American Revolution. One complete cinematographic work tells a story from the British perspective, in which those loyal to the Crown cannot understand why anyone would want to be independent from the British Empire, while the second tells a story from the traditional America perspective. As a self-contained story, in the first complete cinematographic work the characters vary in their stance and stature and in their reasons for being involved—those who are staunchly loyal to the Crown, those who got involved to feed their greed and those who were left with no choice as their only means of employment or to feed their families and keep their homes on both sides of the conflict. Some did the job solely to protect their families at home in England—protecting them from the ridicule of their neighbors, being ostracized or even taken into custody as traitors. Similarly, the second complete cinematographic work outlines the American story—the quest for independence and the impact of the British on the lives of the colonists in general. The drama shows the back-and-forth between those that still wanted a relationship with the Crown and those that wanted radical change, as well as the business benefits to some of those driving the movement for independence. While there is a commonality in that both complete cinematographic works depict an aspect of the same historical event, the primary commonality or "knot" between the two stories is a love story between a British soldier and a colonist loyal to the patriot cause of independence. Viewers watching the first complete cinematographic work before the second will tend to be sympathetic to the Crown, and view the independence movement as ungrateful for the military protection and commercial opportunities provided by membership in the British Empire. Viewers watching the second complete cinematographic work before the first will tend to take the American side, viewing the Crown as arbitrarily suppressing the basic rights of the colonists as Englishmen.

In another example, two complete cinematographic works outline an ongoing conflict between the local police and the mob as to who will control the streets. One complete cinematographic work outlines the struggles of the police force to gain control of the streets. Loyalty to brother and sister officers is prime, and there is a strong sense of family and camaraderie. The officers are portrayed as honest and self-sacrificing public servants trying to protect the public from a brutal criminal organization, a theme which drives the viewer to want to proudly belong to their organization. The other complete cinematographic work outlines the struggles of the mob to keep some semblance of control on the streets in the face of an onslaught from a police force pursuing its own agenda. The mobsters are portrayed as good guys in their own right, trying to suppress more violent gangs and working to ensure that their own are safe and well kept, including random acts of kindness, getting kids the education they need (for example, the money needed for a bright neighborhood kid to attend college mysteriously appears, provided anonymously by the mobsters). Loyalty to fellow members of the organization is prime, and there is a strong sense of family and belonging, a theme which drives the viewer to want to proudly belong to their organization. In both films, loyalty and respect is earned and returned. The commonality or "knot" is common characters across both complete cinematographic works. The two complete cinematographic works show the same characters living by the same set of rules, but on both sides of the law, driving the question of true right versus wrong, justice versus survival. Legal guns versus illegal guns. Legal cash versus illegal cash. The exact same emotions run through characters perceived as distinct opposites. Viewers watching the first complete cinematographic work before the second will tend to side with the police and view the mobsters as a ruthless criminal organization to be destroyed. Viewers watching the second complete cinematographic work before the first will tend to be sympathetic to the mobsters, and view the police as corrupt in the sense of pursuing their own interests rather than protecting the public.

In a further example, a first complete cinematographic work presents a fictionalized or semi-fictionalized account of the experiences of those who died in the World Trade Center on the morning of Sep. 11, 2001 and the subsequent experiences of their families and friends, and a second complete cinematographic work presents a fictionalized or semi-fictionalized account of the experiences of individuals who, but for the fickle hand of fate (a missed train, a sick child, a firing, all of which seemed terrible at the time) would have been in the twin towers when they were hit. The commonalities or "knots" are the impacts of the first and second airplanes and the emergency response. Viewers watching the first complete cinematographic work before the second will tend to come away with an appreciation for how apparent calamities may be blessings in disguise. Viewers watching the second complete cinematographic work before the first will tend to feel the unfairness of life, asking "why couldn't the others have missed work that day?" The knots are the first and second plane hits and the response teams.

In yet another example, first and second complete cinematographic works deal with the issue of addiction from the perspective of the addict and from the perspectives of those close to the addict, respectively. The first complete cinematographic work depicts the addict's perspective and outlines the emotional turmoil of being addicted and the perceived cause(s) of that addiction. The characters surrounding the addict have differing opinions of what drove the addict to it and whether the addict is an innocent victim or is to blame for their actions. The story outlines the personal loss of everything as the addict hits rock bottom. The second complete cinematographic work outlines the emotional turmoil of supporting an addict and being driven to the terrible choice of supporting them while trying to prevent them from hitting rock bottom or having to push them away to experience rock bottom all alone. The commonality or "knot" may be the simple gift of a bottle of cognac at Christmas—a welcome gesture in one complete cinematographic work is raw torture in the other complete cinematographic work. Viewers watching the first complete cinematographic work before the second will tend to have sympathy for the addict and view those around the addict as unfeeling or unsympathetic. Viewers watching the second complete cinematographic work before the first will tend to have sympathy for those around the addict and view the addict as selfish and self-centered.

Yet a further example provides first and second complete cinematographic works relating to the decision whether or not to pursue a dream. In the first complete cinematographic work the protagonist decides to pursue the dream, and in the second complete cinematographic work the protagonist decides not to pursue the dream. The first and second complete cinematographic works are constructed so that viewers watching the first complete cinematographic work before the second will perceive this first synthesis cinematographic work as a story in which the protagonist fantasizes about pursuing the dream but ultimately decides not to, whereas viewers watching the second complete cinematographic work before the first will perceive this second synthesis cinematographic work as a story in which the protagonist contemplates what life would be like if s/he doesn't pursue the dream and then decides to pursue it. The commonality or "knot" is the "fork in the road"—the path taken or not taken.

A still further example could be first and second complete cinematographic works based on mythology, such as Greek mythology. A first complete cinematographic work could treat the gods as protagonists and deal with how they are impacted by the actions of humans, and a second complete cinematographic work could treat the humans as protagonists and deal with how they are impacted by the actions of the gods. Depending on the order in which the first and second complete cinematographic works are viewed (i.e. whether the first synthesis cinematographic work or the second synthesis cinematographic work is viewed), a viewer may perceive either the gods or the humans as callously indifferent to the others.

An additional example provides first and second complete cinematographic works in which an outsider has infiltrated women's homes and is keeping a close eye on their activities. In the first complete cinematographic work, the plot explores the anguish and horror of the characters who perceive that they are being stalked, but are denied the support of local law enforcement authorities in protecting them because of their individual histories (e.g. prostitution, drug use, class distinctions, etc.). The second complete cinematographic work omits the anguish and horror, and portrays the characters as being under the protection of the outsider, who is keeping them safe from others in their environments like violent husbands and abusive neighbors. Those viewing the first complete cinematographic work before the second (i.e. those viewing the first synthesis cinematographic work) will tend to perceive the outsider as an evil stalker, and be unmoved by the protective actions shown in the second complete cinematographic work. In contrast, those viewing the second complete cinematographic work before the first (i.e. those viewing the second synthesis cinematographic work) will tend to perceive the outsider as a selfless protector, and react to the anguish and horror shown in the first complete cinematographic work as oblivious ingratitude by those under the outsider's protection.

Figure 1B:
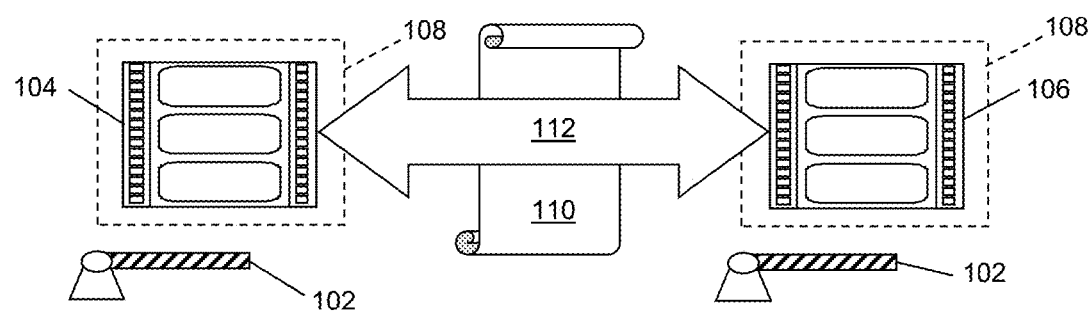
Figure 1C:
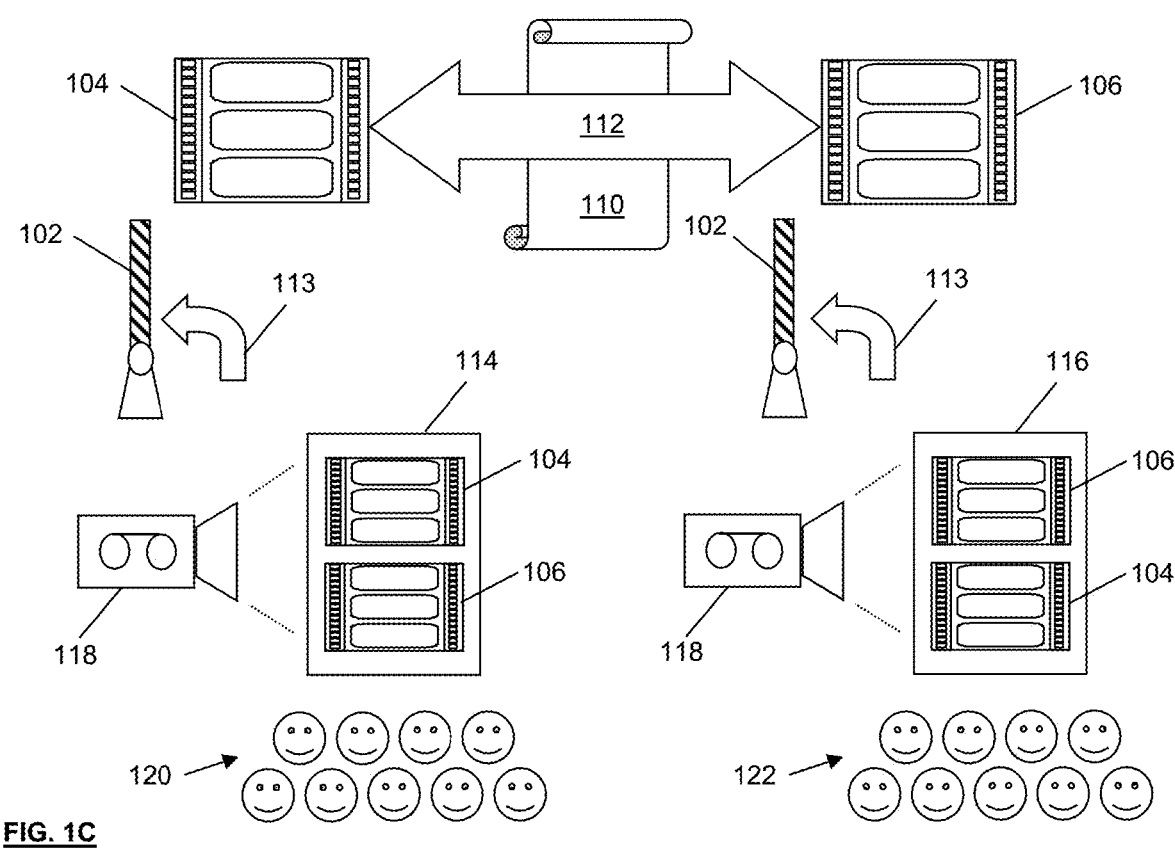

Reference is now made to FIGS. 1A to 1C, which schematically illustrate a method for presenting cinematographic works. As shown in FIG. 1A, the method comprises imposing authorization limits 102 which limit authorization to present a first complete cinematographic work 104 and a second complete cinematographic work 106. The authorization limits 102 may include legal (e.g. contractual) restrictions as well as technological access restrictions. As shown by the dashed boxes 108, the first complete cinematographic work 104 and the second complete cinematographic work 106 are unreleased when the authorization limits 102 are imposed. The term "unreleased", as used in this context, means that the first complete cinematographic work 104 and the second complete cinematographic work 106 have not been made generally available to the public (e.g. by presentation in theaters, distribution via cable or over-the-air television or via the Internet) although they may have been viewed by a small number of individuals having a duty of confidentiality (e.g. studio employees, movie critics, theater managers, etc.).

As shown in FIG. 1B, while the authorization limits 102 remain in place and the first complete cinematographic work 104 and the second complete cinematographic work 106 remain unreleased (dashed boxes 108), at least one communication 110 is disseminated. The communication 110 contains information 112 linking the first complete cinematographic work 104 to the second complete cinematographic work 106. The information 112 could, for example, indicate that the first complete cinematographic work 104 and the second complete cinematographic work 106 contain related stories as described above, and may include one or more trailers. The communication(s) 110 may include audio communication(s) such as radio or podcast advertisement(s), video communication(s) such as television or Internet video commercials, posters, billboards (dynamic or static), e-mails (with or without links and/or embedded content), SMS, iMessage or similar messages, public events as well as other types of communication.

Referring now to FIG. 1C, after disseminating at least one of the communication(s) 110, the authorization limits 102 are substantially simultaneously removed, as shown by arrows 113, so as to authorize presentation of both the first complete cinematographic work 104 and the second complete cinematographic work 106. Further communications 110 may continue to be disseminated after the authorization limits 102 are removed. In addition, after removing the authorization limits 102, the method causes a first synthesis cinematographic work 114 and a second synthesis cinematographic work 116 to be presented using at least one cinematographic presentation device 118. The term "cinematographic presentation device" is used herein to refer to any device that can present a motion picture (with or without sound although preferably with sound). As such, a "cinematographic presentation device" includes, but is not limited to, a theater projector/sound system (conventional film or digital), a television (alone or in combination with one or more of a DVD/Blu-Ray player, a set-top box, a DVR, cable tuner, computer, Internet streaming device such as Apple TV, Roku and other similar devices), a laptop computer, a desktop computer and monitor, a tablet computer, and a smartphone. The use of the cinematographic presentation device(s) is essential to the method.

Continuing to refer to FIG. 1C, the first synthesis cinematographic work 114 comprises the first complete cinematographic work 104 followed by the second complete cinematographic work 106, and the second synthesis cinematographic work 116 comprises the second complete cinematographic work 106 followed by the first complete cinematographic work 104. In this context, the term "followed by" encompasses a scenario where the first complete cinematographic work 104 and the second complete cinematographic work 106 share one or more common scenes that are shown only once and are not repeated in the presentation of the synthesis cinematographic works 114, 116 despite appearing in both complete cinematographic works 104, 106. In some embodiments, however, scenes that are common to both the first complete cinematographic work 104 and the second complete cinematographic work 106 may be shown more than once. The first synthesis cinematographic work 114 is presented to at least one first individual 120 and the second synthesis cinematographic work 116 is presented to at least one second individual 122 who is different from the first individual. Thus, typically, different groups of individuals 120, 122 would see each of the first synthesis cinematographic work 114 and the second synthesis cinematographic work 116 and form different impressions. In particular, even though the different groups of individuals 120, 122 will have cumulatively seen the same content (i.e. the first complete cinematographic work 104 and the second complete cinematographic work 106), they will have seen this content in a different order so as to influence the way it is perceived.

The above-described method can be extended beyond a first complete cinematographic work and a second cinematographic work to apply to three or more complete cinematographic works. For example, imposing the authorization limit may further comprise limiting authorization to present a third complete cinematographic work which is unreleased when the authorization limits are imposed, and the communication(s) may contain further information linking the third complete cinematographic work to at least one of the first complete cinematographic work and the second complete cinematographic work. In such an embodiment, all of the authorization limits would be substantially simultaneously removed so as to authorize presentation of the first complete cinematographic work, the second complete cinematographic work and the third complete cinematographic work. After authorizing presentation of the first complete cinematographic work, the second complete cinematographic work and the third complete cinematographic work, at least one cinematographic presentation device would be used to present, in addition to the first synthesis cinematographic work and the second synthesis cinematographic work, a third synthesis cinematographic work. The third synthesis cinematographic work may be the first complete cinematographic work followed by the third complete cinematographic work, the second complete cinematographic work followed by the third complete cinematographic work, the third complete cinematographic work followed by the first complete cinematographic work or the third complete cinematographic work followed by the second complete cinematographic work. The third synthesis cinematographic work would be presented to at least one third individual who is different from the first individual and the second individual.

Presentation of a first synthesis cinematographic work and a second synthesis cinematographic work may be implemented in a commercial movie theater environment where one or more groups of patrons view a common screen. In an embodiment which is implemented in a movie theater environment, the cinematographic presentation device(s) 118 will be one or more cinematographs. The term "cinematograph", as used herein, refers to a projection device that can present a motion picture (with or without sound although preferably with sound) onto a screen in front of an audience, from behind the screen or from in front of the screen above and/or behind the audience, and includes traditional film projectors and digital projectors. In theatrical presentation, the use of a cinematograph is essential. A method for theatrical presentation of cinematographic works may be implemented in a movie theater multiplex (i.e. a complex having a plurality if individual theaters) or using only a single theater.

Figure 2A:
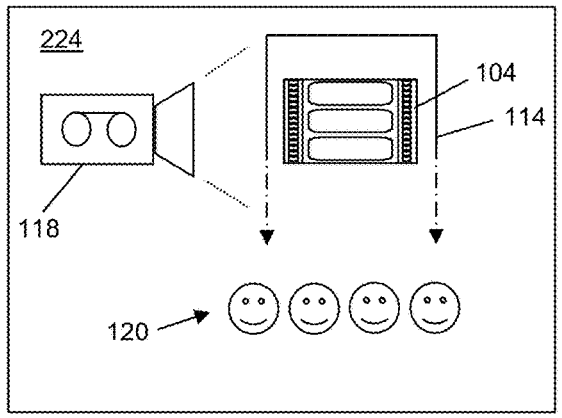
FIGS. 2A to 2E show, in schematic form, implementation of an exemplary method for theatrical presentation of cinematographic works using a single movie theater.
Figure 2B:
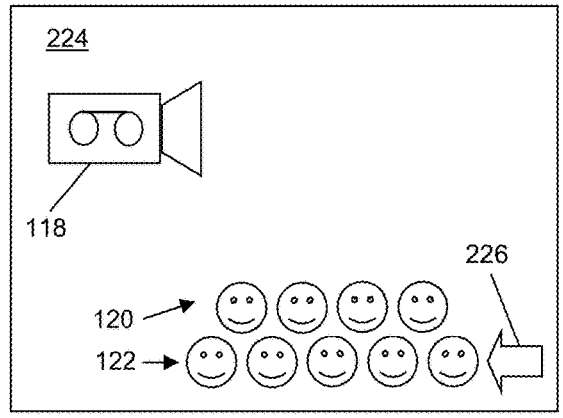
Figure 2C:
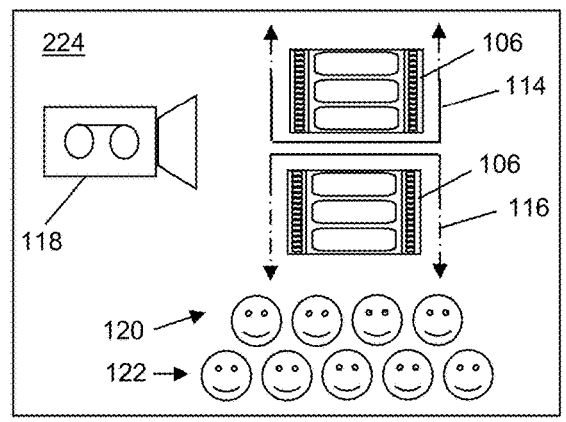
Figure 2D:
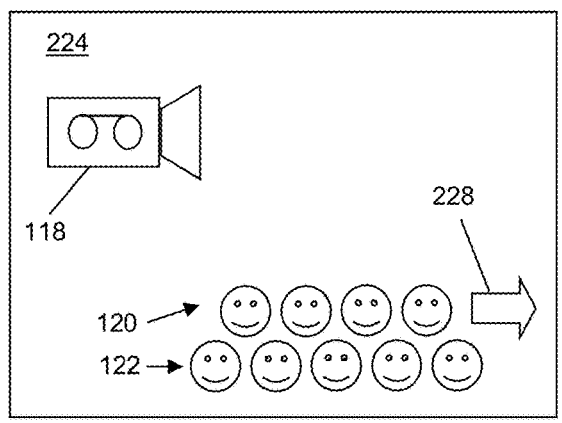
Figure 2E:
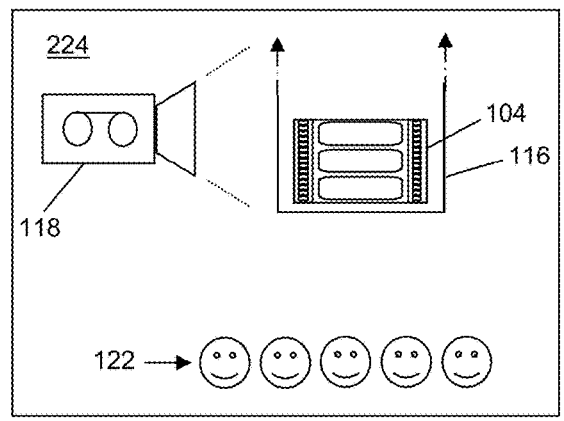

Reference is first made to FIGS. 2A to 2E, which show, in schematic form, implementation of an exemplary method for theatrical presentation of cinematographic works in which both the first synthesis cinematographic work 114 and the second synthesis cinematographic work 116 are presented in a single movie theater 224. A plurality of patrons is organized into a first group of patrons 120 and a second group of patrons 122 that is different from the first group of patrons 120. As shown in FIG. 2A, before presenting the second complete cinematographic work 106, a single cinematograph 118 is used to present the first complete cinematographic work 104 while the first group of patrons 120 is in the single movie theater 224 and the second group of patrons 122 is absent from the single movie theater 224. As shown in FIG. 2B, after presentation of the first complete cinematographic work 104, the second group of patrons 122 enters the single movie theater 224, as shown by arrow 226, while the first group of patrons 120 remains therein. This may occur, for example, during an intermission, and it is understood that even if some members of the first group of patrons 120 leave the single movie theater 224 and then return, for example to use the restroom or to purchase popcorn or other comestibles, it is still considered that the first group of patrons 120 remains in the single movie theater 224. Next, as shown in FIG. 2C, the cinematograph 118 is used to present the second complete cinematographic work 106 while both the first group of patrons 120 and the second group of patrons 122 are in the single movie theater 224. As shown in FIG. 2D, after presenting the second complete cinematographic work 106, the first group of patrons 120 departs the single movie theater 224, as shown by arrow 228, while the second group of patrons 122 remains in the single movie theater 224. Again, it is understood that even if some members of the second group of patrons 122 leave the single movie theater 224 and then return, it is still considered that the second group of patrons 122 remains in the single movie theater 224. As shown in FIG. 2E, after the first group of patrons 120 departs, the cinematograph 118 is used to present the first complete cinematographic work 104 again while the second group of patrons 122 is in the single movie theater 224 and the first group of patrons 120 is absent from the single movie theater 224. Thus, the first group of patrons 120 viewed the first synthesis cinematographic work 114, which comprises the first complete cinematographic work 104 followed by the second complete cinematographic work 106, and the second group of patrons 122 viewed the second synthesis cinematographic work 116, which comprises the second complete cinematographic work 106 followed by the first complete cinematographic work 104. As illustrated schematically in FIG. 2C, in this embodiment the single presentation of the second complete cinematographic work 106 is common to presentation of the first synthesis cinematographic work 114 and presentation of the second synthesis cinematographic work 116.

Figure 3:
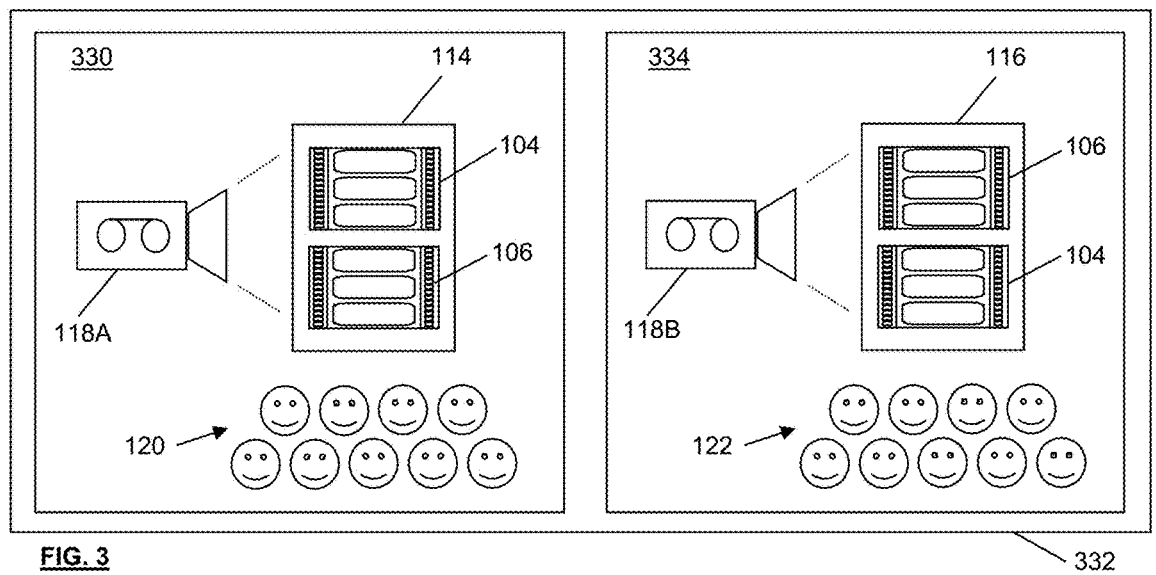
FIG. 3 shows, in schematic form, implementation of an exemplary method for theatrical presentation of cinematographic works in a multiplex theater environment.

Reference is now made to FIG. 3, which shows, in schematic form, implementation of an exemplary method for theatrical presentation of cinematographic works in a movie theater multiplex. A plurality of patrons is organized into a first group of patrons 120 and a second group of patrons 122 that is different from the first group of patrons 120. A first cinematograph 118A is used to present the first synthesis cinematographic work 114 to the first group of patrons 120 in a first movie theater 330 in a movie theater multiplex 332, and a second cinematograph 118B is used to present the second synthesis cinematographic work 116 to the second group of patrons 122 in a second movie theater 334 in the movie theater multiplex 332. As described above, the first synthesis cinematographic work 114 comprises a first complete cinematographic work 104 followed by a second complete cinematographic work 106, and the second synthesis cinematographic work 116 comprises the second complete cinematographic work 106 followed by the first complete cinematographic work 104. Typically, presentation of the first synthesis cinematographic work 114 temporally overlaps presentation of the second synthesis cinematographic work 116; i.e. they will be presented at approximately the same time, although they may be of different durations and one may start earlier than the other and/or one may end later than the other.

In both the single theater method shown in FIGS. 2A to 2E and the movie theater multiplex method shown in FIG. 3, any suitable method may be used to organize the plurality of patrons into the first group of patrons 120 and the second group of patrons 122, and the organization may be carried out by using a computer system or manually by staff of the movie theater(s) or by the patrons themselves. For example, organizing the plurality of patrons into the first group of patrons 120 and the second group of patrons 122 may be carried out by random selection, by algorithmic selection, or by individual patrons selecting one of the first synthesis cinematographic work and the second synthesis cinematographic work. It is noted that where the cinematograph(s) are digital cinematograph(s), the methods shown in FIGS. 2A to 2E and in FIG. 3 will necessarily involve a transformation of data from digital form to visual or audiovisual form.

Figure 4:
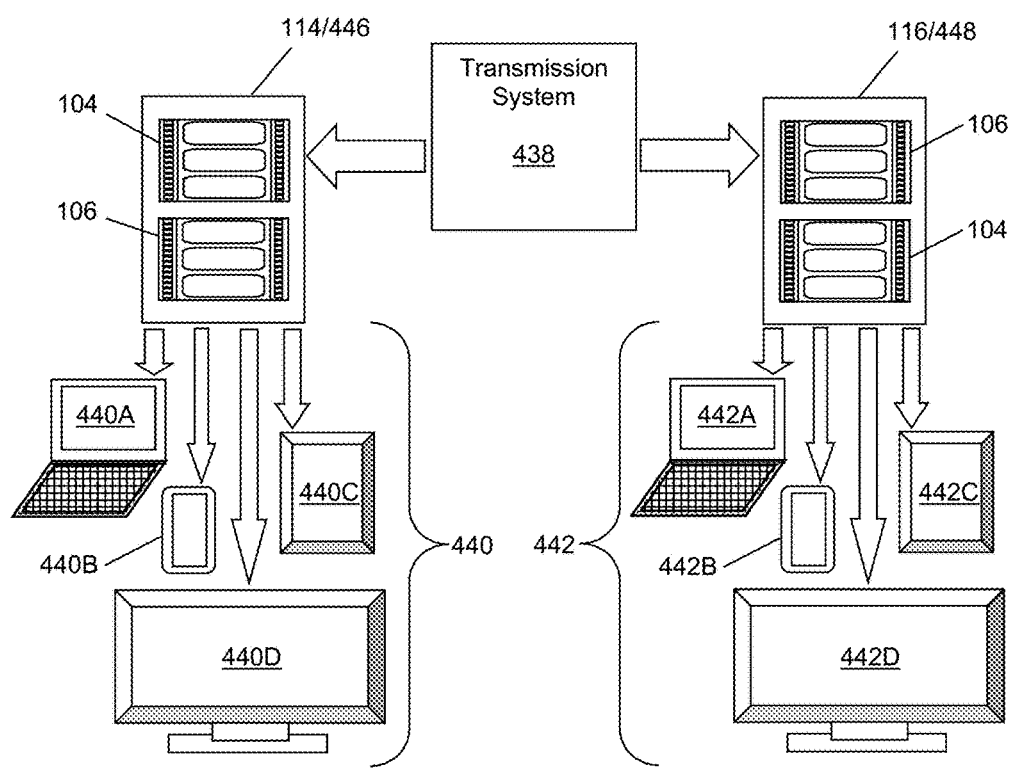
FIG. 4 schematically illustrates a first exemplary method for transmitting cinematographic works to remote cinematographic presentation devices.

Presentation of a first synthesis cinematographic work and a second synthesis cinematographic work may also be implemented in a digitally distributed environment. In this regard, FIG. 4 schematically illustrates a first exemplary method for transmitting cinematographic works in digital form to remote cinematographic presentation devices. As noted above, a "cinematographic presentation device" includes a television (alone or in combination with one or more of a DVD/Blu-Ray player, a set-top box, a DVR, cable tuner and other similar devices), a laptop computer, a desktop computer and monitor, a tablet computer, and a smartphone.

As shown in FIG. 4, there are a plurality of remote cinematographic presentation devices, including laptop computers 440A, 442A, smartphones 440B, 442B, tablets 440C, 442C and televisions 440D, 442D. The generic term "computer", as used herein, encompasses desktop computers, laptop computers, smartphones, tablet computers and other computing devices capable of being used to present a cinematographic work. The cinematographic presentation devices 440A, 442A, 440B, 442B, 440C, 442C, 440D, 442D are "remote" in the sense that they are physically distant from one another, and may be in different homes, different cities or even different countries, and are also physically distant from a transmission system 438. In some embodiments, some or all of the cinematographic presentation devices 440A, 442A, 440B, 442B, 440C, 442C, 440D, 442D may be communicatively coupled to the transmission system 438 or a portion thereof via a network (e.g. the Internet). The transmission system 438 may comprise one or more of an over-the-air television broadcasting system, a cable broadcasting system and/or one or more server computers, which may be co-located or physically distant but communicatively coupled so as to cooperate with one another.

The cinematographic presentation devices 440A, 442A, 440B, 442B, 440C, 442C, 440D, 442D are organized into a first group 440 of remote cinematographic presentation devices 440A, 440B, 440C, 440D and a second group 442 of remote cinematographic presentation devices 442A, 442B, 442C, 442D. The organization of the cinematographic presentation devices 440A, 442A, 440B, 442B, 440C, 442C, 440D, 442D into groups 440, 442 may be carried out via logic executed by the transmission system 438 or via logic executed by the plurality of remote cinematographic presentation devices 440A, 442A, 440B, 442B, 440C, 442C, 440D, 442D, either individually or cooperatively.

The transmission system 438 transmits the first complete cinematographic work 104 and the second complete cinematographic work 106 to the plurality of remote cinematographic presentation devices 440A, 442A, 440B, 442B, 440C, 442C, 440D, 442D. The transmissions to the plurality of remote cinematographic presentation devices 440A, 442A, 440B, 442B, 440C, 442C, 440D, 442D may include one or more of Internet streaming, television broadcasting and cable transmission. This approach would be suitable for an embodiment which contemplates "real-time" viewing. The transmissions to the plurality of remote cinematographic presentation devices 440A, 442A, 440B, 442B, 440C, 442C, 440D, 442D may also (or alternatively) take the form of storable media data for storage on the plurality of remote cinematographic presentation devices 440A, 442A, 440B, 442B, 440C, 442C, 440D, 442D and later playback thereon. The transmissions to the plurality of remote cinematographic presentation devices 440A, 442A, 440B, 442B, 440C, 442C, 440D, 442D may be substantially simultaneous or may occur at different times for each of the remote cinematographic presentation devices 440A, 442A, 440B, 442B, 440C, 442C, 440D, 442D.

According to the method, the first group 440 of remote cinematographic presentation devices 440A, 440B, 440C, 440D is caused to present a first synthesis cinematographic work 114, and the second group 442 of remote cinematographic presentation devices 442A, 442B, 442C, 442D is caused to present a second synthesis cinematographic work 116. The first synthesis cinematographic work 114 comprises the first complete cinematographic work 104 followed by the second complete cinematographic work 106, and the second synthesis cinematographic work 116 comprises the second complete cinematographic work 106 followed by the first complete cinematographic work 104. Presentation of the first synthesis cinematographic work 114 may be caused by transmitting the first synthesis cinematographic work 114 as a monolithic file or data stream, or by transmitting the first complete cinematographic work 104 and the second complete cinematographic work 106 as two or more distinct files or data streams and also transmitting instructions 446 for the order of presentation. Likewise, presentation of the second synthesis cinematographic work 116 may be caused by transmitting the second synthesis cinematographic work 116 as a monolithic file or data stream, or by transmitting the first complete cinematographic work 104 and the second complete cinematographic work 106 as two or more distinct files or data streams and also transmitting instructions 448 for the order of presentation.

Because the remote cinematographic presentation devices 440A, 442A, 440B, 442B, 440C, 442C, 440D, 442D are digital, the methods shown in FIG. 4 will necessarily involve a transformation of data from digital form to visual or audiovisual form. Accordingly, the term "digital cinematographic presentation device" refers to a cinematographic presentation device (as previously defined) in which data is transformed from digital form to visual or audiovisual form, and includes a digital television (alone or in combination with one or more of a DVD/Blu-Ray player, a digital set-top box, a DVR and other similar devices), a laptop computer, a desktop computer and monitor, a tablet computer, and a smartphone, or other network-enabled digital media device.

As indicated above, the methods described herein can be extended beyond a first complete cinematographic work and a second cinematographic work to apply to three or more complete cinematographic works. With only two complete cinematographic works, there are only two possible unique permutations: in a first permutation the first complete cinematographic work is followed by the second cinematographic work, and in the second permutation the second complete cinematographic work is followed by the first cinematographic work. With three complete cinematographic works, the number of unique permutations expands to six. Increasing the number of complete cinematographic works will increase the number of unique permutations, as shown in the table below:

| Number of Complete Cinematographic Works | Number of Unique Viewing Permutations |
| --- | --- |
| 2 | 2 |
| 3 | 6 |
| 4 | 24 |
| 5 | 120 |
| 6 | 720 |
| 7 | 5,040 |
| 8 | 40,320 |
| 9 | 362,880 |
| 10 | 3,628,800 |
| 11 | 39,916,800 |
| 12 | 479,001,600 |
| 13 | 6,227,020,800 |
| 14 | 87,178,291,200 |
| 15 | 1,307,674,368,000 |
| 16 | 20,922,789,888,000 |
| 17 | 355,687,428,096,000 |
| 18 | 6,402,373,705,728,000 |
| 19 | 121,645,100,408,832,000 |
| 20 | 2,432,902,008,176,640,000 |

Figure 5:
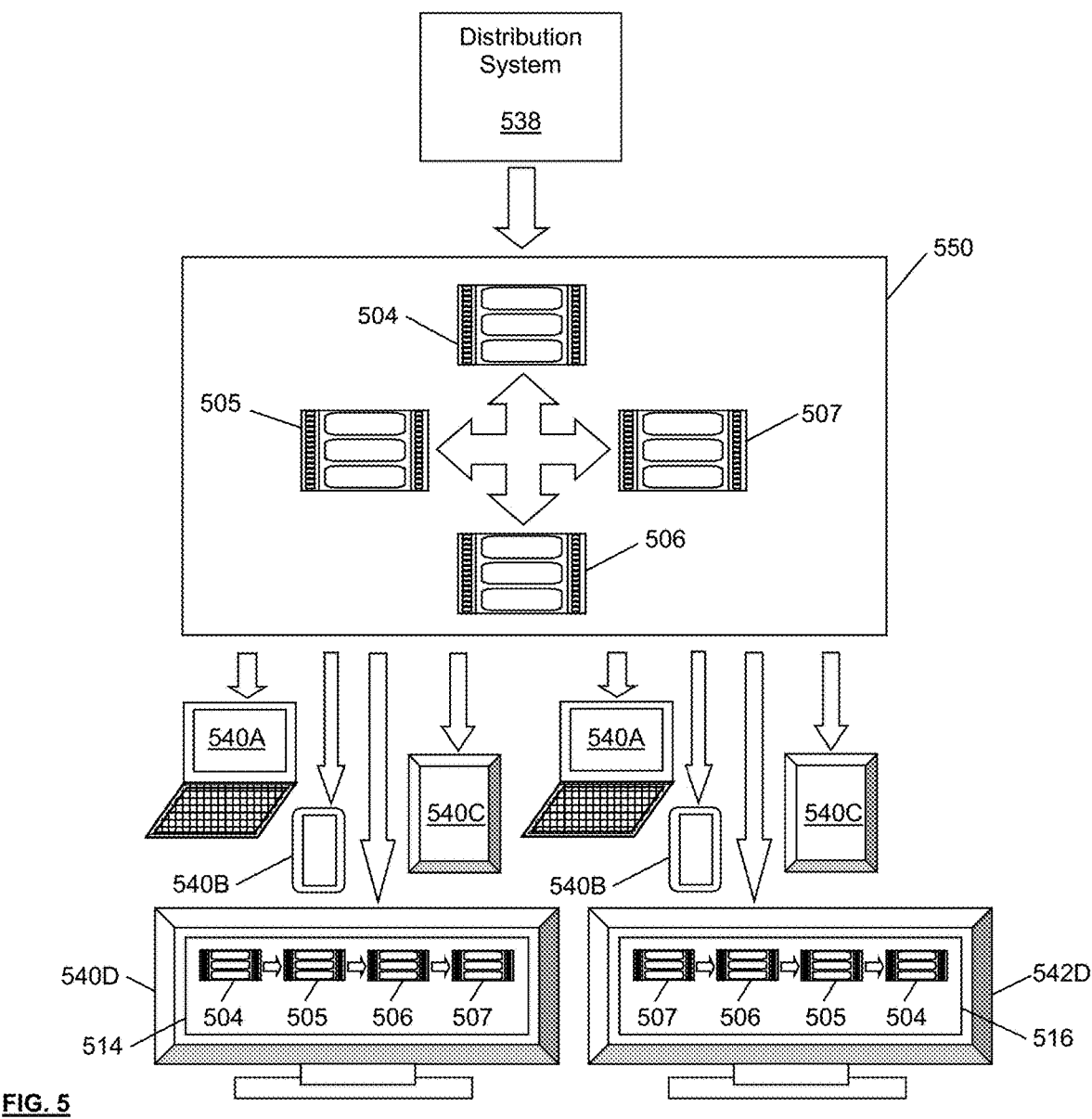
FIG. 5 schematically illustrates a second exemplary method for transmitting cinematographic works to remote cinematographic presentation devices.

Reference is now made to FIG. 5, which shows a second method for transmitting cinematographic works to remote cinematographic presentation devices. As can be seen in FIG. 5, there are a plurality of remote digital cinematographic presentation devices, including laptop computers 540A, smartphones 540B, tablets 540C and digital televisions 540D, 542D which are "remote" in the sense that they are physically distant from one another, and may be in different homes, different cities or even different countries, and are also physically distant from a distribution system 538. The distribution system 538 may comprise one or more server computers, which may be located in the same facility or may be dispersed across two or more facilities and communicatively coupled so as to cooperate with one another. The remote digital cinematographic presentation devices 540A, 540B, 540C, 540D, 542D are at least intermittently communicatively coupled to the distribution system 538 or a portion thereof via a network (e.g. the Internet).

The distribution system 538 transmits digital copies of a plurality 550 of complete cinematographic works to the remote digital cinematographic presentation devices 540A, 540B, 540C, 540D, 542D. In the exemplary embodiment shown in FIG. 5, the plurality 550 of complete cinematographic works consists of four complete cinematographic works; there is a first complete cinematographic work 504, a second complete cinematographic work 505, a third complete cinematographic work 506 and a fourth complete cinematographic work 507. In other embodiments, there may be more or fewer complete cinematographic works. The words "first", "second", "third" and "fourth" do not imply an order of presentation within a synthesis cinematic work but merely distinguish between different complete cinematographic works. The digital copies of the complete cinematographic works 504, 505, 506, 507 may be transmitted by Internet streaming, by transmitting storable media data for storage on the plurality of remote cinematographic presentation devices and later playback thereon, or by some combination thereof.

The complete cinematographic works 504, 505, 506, 507 are conjoinable according to at least two unique permutations to form at least two unique synthesis cinematographic works. In the exemplary embodiment shown in FIG. 5, there are four complete cinematographic works which are conjoinable according to twenty-four unique permutations to form twenty-four unique synthesis cinematographic works. This is merely one illustrative example, and it is contemplated that there may be embodiments in which the complete cinematographic works are conjoinable according to a number of unique permutations that is less than the theoretical maximum number of unique permutations, i.e. there may be some unique permutations (viewing orders) that are prohibited, or only a subset of the total number of complete cinematographic works may be viewed. Preferably, there are at least three complete cinematographic works conjoinable according to at least six unique permutations to form at least six unique synthesis cinematographic works. More preferably, there are at least four complete cinematographic works conjoinable according to at least twenty-four unique permutations to form at least twenty-four unique synthesis cinematographic works. Still more preferably, there are at least five complete cinematographic works conjoinable according to at least one-hundred-twenty (120) unique permutations to form at least one-hundred-twenty (120) unique synthesis cinematographic works. Yet even more preferably, there are at least ten complete cinematographic works conjoinable according to at least three million, six-hundred-twenty-eight thousand, eight hundred (3,628,800) unique permutations to form at least three million, six-hundred-twenty-eight thousand, eight hundred (3,628,800) unique synthesis cinematographic works. Still yet even more preferably, there are at least fifteen complete cinematographic works conjoinable according to at least one trillion, three-hundred-seven billion, six-hundred-seventy-four million, three-hundred-sixty-eight thousand (1,307,674,368,000) unique permutations to form at least one trillion, three-hundred-seven billion, six-hundred-seventy-four million, three-hundred-sixty-eight thousand (1,307,674,368,000) unique synthesis cinematographic works.

The remote digital cinematographic presentation devices 540A, 540B, 540C, 540D, 542D present at least two different unique permutations of the complete cinematographic works 504, 505, 506, 507 to form at least two unique synthesis cinematographic works. This is illustrated in FIG. 5. A first one of the remote cinematographic presentation devices, namely a first digital television 540D, automatically presents a conjunction of the complete cinematographic works 504, 505, 506, 507 according to a first unique permutation so as to present a first unique synthesis cinematographic work 514. Similarly, a second one of the remote cinematographic presentation devices, namely a second digital television 542D, automatically presents a conjunction of the complete cinematographic works 504, 505, 506, 507 according to a second unique permutation so as to present a second unique synthesis cinematographic work 516. The first synthesis cinematographic work 514 consists of the first complete cinematographic work 504 followed by the second complete cinematographic work 505 followed by the third complete cinematographic work 506 followed by the fourth complete cinematographic work 507, and is different from the second synthesis cinematographic work 516, which consists of the fourth complete cinematographic work 507 followed by the third complete cinematographic work 506 followed by the second complete cinematographic work 505 followed by the first complete cinematographic work 504. The first remote cinematographic presentation device, namely the first digital television 540D, is different from the second remote cinematographic presentation device, namely the second digital television 542D.

The permutations according to which the complete cinematographic works 504, 505, 506, 507 are conjoined may be specified locally on the remote digital cinematographic presentation devices 540A, 540B, 540C, 540D, 542D, for example randomly or according to a user preference, or may be specified by the distribution system 538.

The methods for presenting, transmitting and distributing cinematographic works as described herein represent significantly more than merely using categories to organize, store and transmit information and organizing information through mathematical correlations. The methods are in fact an improvement to technology for presenting, transmitting and distributing cinematographic works, as the methods provide for assembly of two or more distinct synthesis cinematographic works using a common set of complete cinematographic works as components. Thus, while some specific illustrative examples of synthesis cinematographic works have been provided so as to illustrate how the method and technology may be applied to enable creative expression, the methods and technology described herein are not directed to the creative and expressive elements of any particular cinematographic works, but rather to presentation and distribution technology which enables that creativity and expression. Moreover, the methods are applied in respect of particular machines, namely cinematographic presentation devices. As such, the methods described herein are confined to cinematographic presentation devices, in some cases confined in particular to cinematographs, and to the specific and limited field of presenting, transmitting and distributing cinematographic works.

Aspects of the present technology may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to schematic diagrams showing methods, apparatus (systems) and computer program products according to various embodiments. In this regard, the schematic diagrams in the Figures illustrate the architecture, functionality, and operation of possible implementations of systems, methods and computer program products according to various embodiments of the present technology. For instance, some elements in the schematic diagrams may represent a module, segment, or portion of instructions, which comprises one or more executable instructions for implementing the specified logical function(s). It will also be noted that aspects of the methods described and illustrated herein can be implemented by special purpose hardware-based systems that perform the specified functions or acts, or combinations of special purpose hardware and computer instructions.

It also will be understood that aspects of the methods described herein can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts described and illustrated herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act described and illustrated herein. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts described and illustrated herein.

Several currently preferred embodiments have been described by way of example. It will be apparent to persons skilled in the art that a number of variations and modifications can be made without departing from the scope of the invention as defined in the claims.

What is claimed is:

1. A method for presenting cinematographic works, the method comprising:
   imposing authorization limits, the authorization limits limiting authorization to present a first complete cinematographic work and a second complete cinematographic work;
   the first complete cinematographic work and the second complete cinematographic work being unreleased when the authorization limits are imposed;
   disseminating at least one communication containing information linking the first complete cinematographic work to the second complete cinematographic work;
   substantially simultaneously removing the authorization limits so as to authorize presentation of both the first complete cinematographic work and the second complete cinematographic work; and
   after removing the authorization limits so as to authorize presentation of the first complete cinematographic work and the second complete cinematographic work, causing to be presented, using at least one cinematographic presentation device:
   a first synthesis cinematographic work, the first synthesis cinematographic work comprising the first complete cinematographic work followed by the second complete cinematographic work; and
   a second synthesis cinematographic work, the second synthesis cinematographic work comprising the second complete cinematographic work followed by the first complete cinematographic work;
   wherein the first synthesis cinematographic work is presented to at least one first individual and the second synthesis cinematographic work is presented to at least one second individual different from the first individual.

2. The method of claim 1, wherein:
imposing the authorization limits further comprises limiting authorization to present a third complete cinematographic work;
the third complete cinematographic work is unreleased when the authorization limits are imposed;
the at least one communication contains further information linking the third complete cinematographic work to at least one of the first complete cinematographic work and the second complete cinematographic work;
substantially simultaneously removing the authorization limits comprises substantially simultaneously authorizing presentation of the first complete cinematographic work, the second complete cinematographic work and the third complete cinematographic work; and
the method further comprises, after authorizing presentation of the first complete cinematographic work, the second complete cinematographic work and the third complete cinematographic work, presenting, using at least one cinematographic presentation device, a third synthesis cinematographic work, the third synthesis cinematographic work comprising one of:
the first complete cinematographic work followed by the third complete cinematographic work;
the second complete cinematographic work followed by the third complete cinematographic work;
the third complete cinematographic work followed by the first complete cinematographic work; and
the third complete cinematographic work followed by the second complete cinematographic work; and
the third synthesis cinematographic work is presented to at least one third individual different from the first individual and the second individual.

3. A method for theatrical presentation of an assembly of two or more distinct synthesis cinematographic works using a common set of complete cinematographic works as components, the method comprising:
for a plurality of patrons sorted into a first group of patrons and a second group of patrons:
providing, in a single movie theatre, at least one cinematograph, wherein the at least one cinematograph is a device that can present a motion picture on a screen in front of an audience;
presenting, by the at least one cinematograph, to the first group of patrons, a first synthesis cinematographic work, the first synthesis cinematographic work comprising a first complete cinematographic work followed by a second complete cinematographic work; and
presenting, by the at least one cinematograph, to the second group of patrons, a second synthesis cinematographic work, the second synthesis cinematographic work comprising the second complete cinematographic work followed by the first complete cinematographic work;
wherein:
the first synthesis cinematographic work and the second synthesis cinematographic work are presented in the single movie theater;
the method further comprising:
before presenting the second complete cinematographic work, presenting the first complete cinematographic work while the first group of patrons is in the single movie theater and the second group of patrons is absent from the single movie theater;
presenting the second complete cinematographic work while both the first group of patrons and the second group of patrons are in the single movie theater; and
after presenting the second complete cinematographic work, presenting the first complete cinematographic work again while the second group of patrons is in the single movie theater and the first group of patrons is absent from the single movie theater;
so that a single presentation of the second complete cinematographic work is common to presentation of the first synthesis cinematographic work and presentation of the second synthesis cinematographic work;
to thereby enable presentation of the first synthesis cinematographic work to temporally overlap presentation of the second synthesis cinematographic work within the simile movie theater.

4. The method of claim 3, wherein the plurality of patrons are sorted into the first group of patrons and the second group of patrons by random selection.

5. The method of claim 3, wherein the plurality of patrons are sorted into the first group of patrons and the second group of patrons by algorithmic selection.

6. The method of claim 3, wherein the plurality of patrons are sorted into the first group of patrons and the second group of patrons by individual patrons selecting one of the first synthesis cinematographic work and the second synthesis cinematographic work.

* * * * *